March 25, 1924.
C. H. SCHURR
1,487,895
WORM WHEEL GENERATING MACHINE
Filed July 3, 1919    10 Sheets-Sheet 9
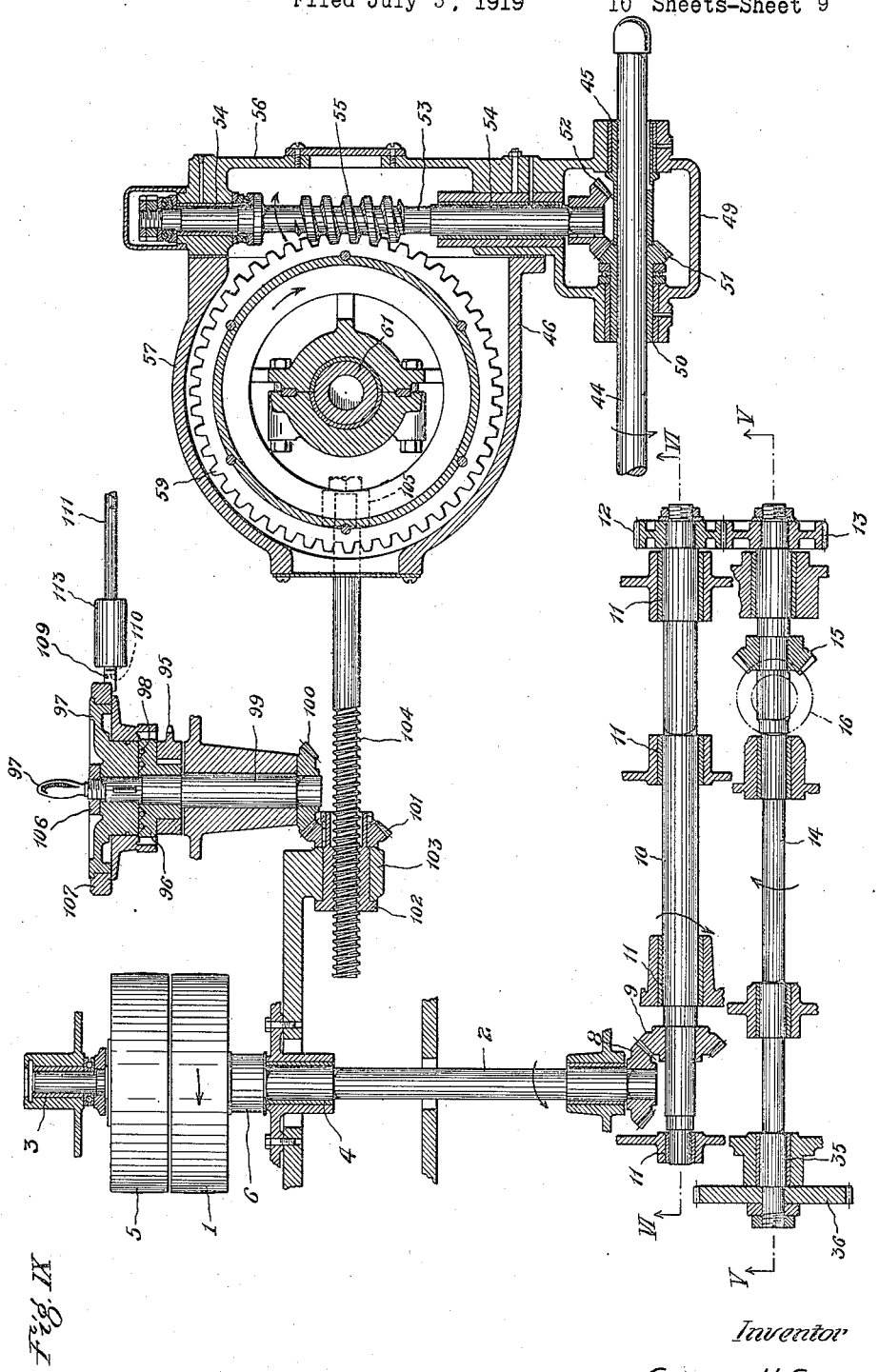
Inventor
CHARLES H. SCHURR
by his att'y.

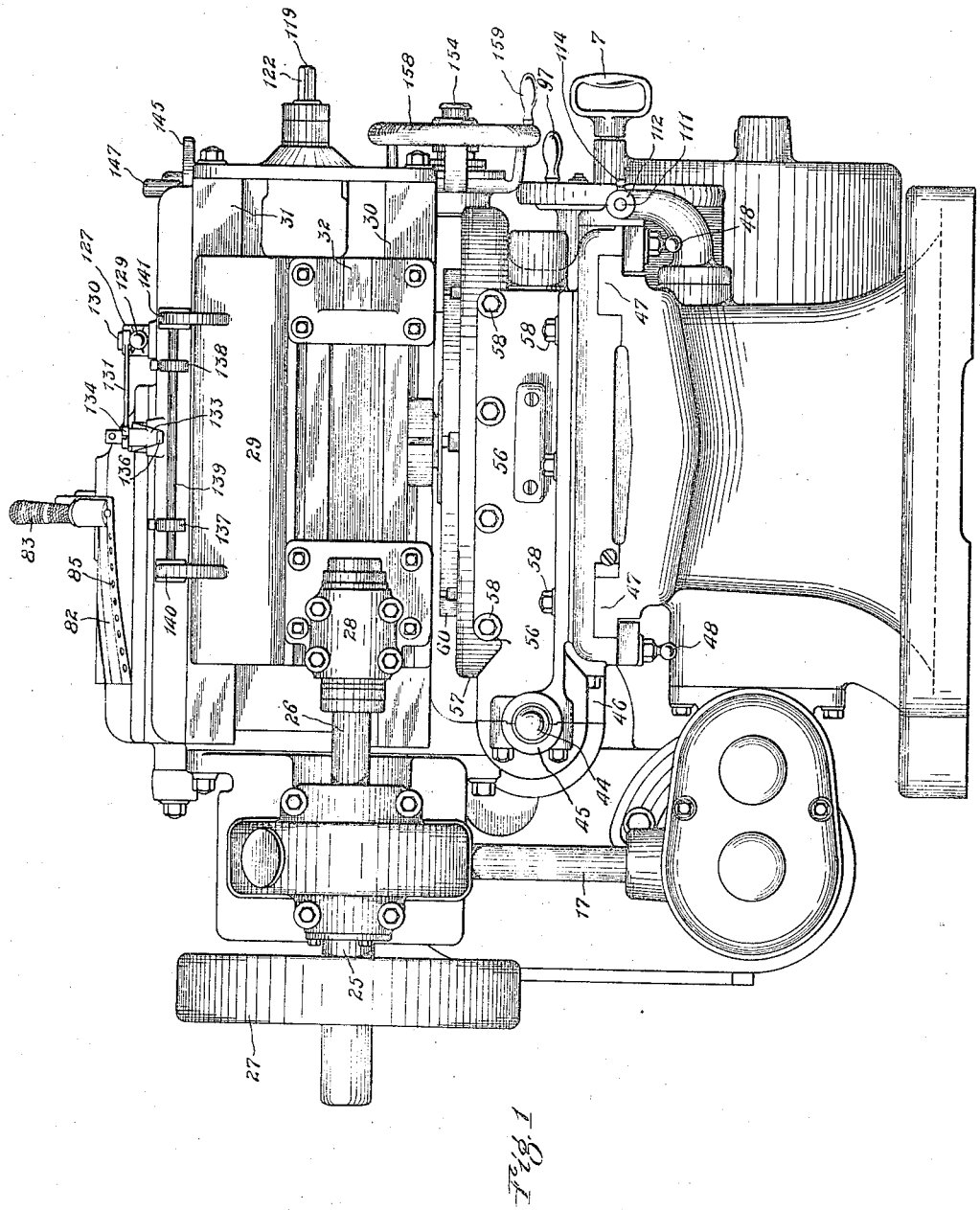

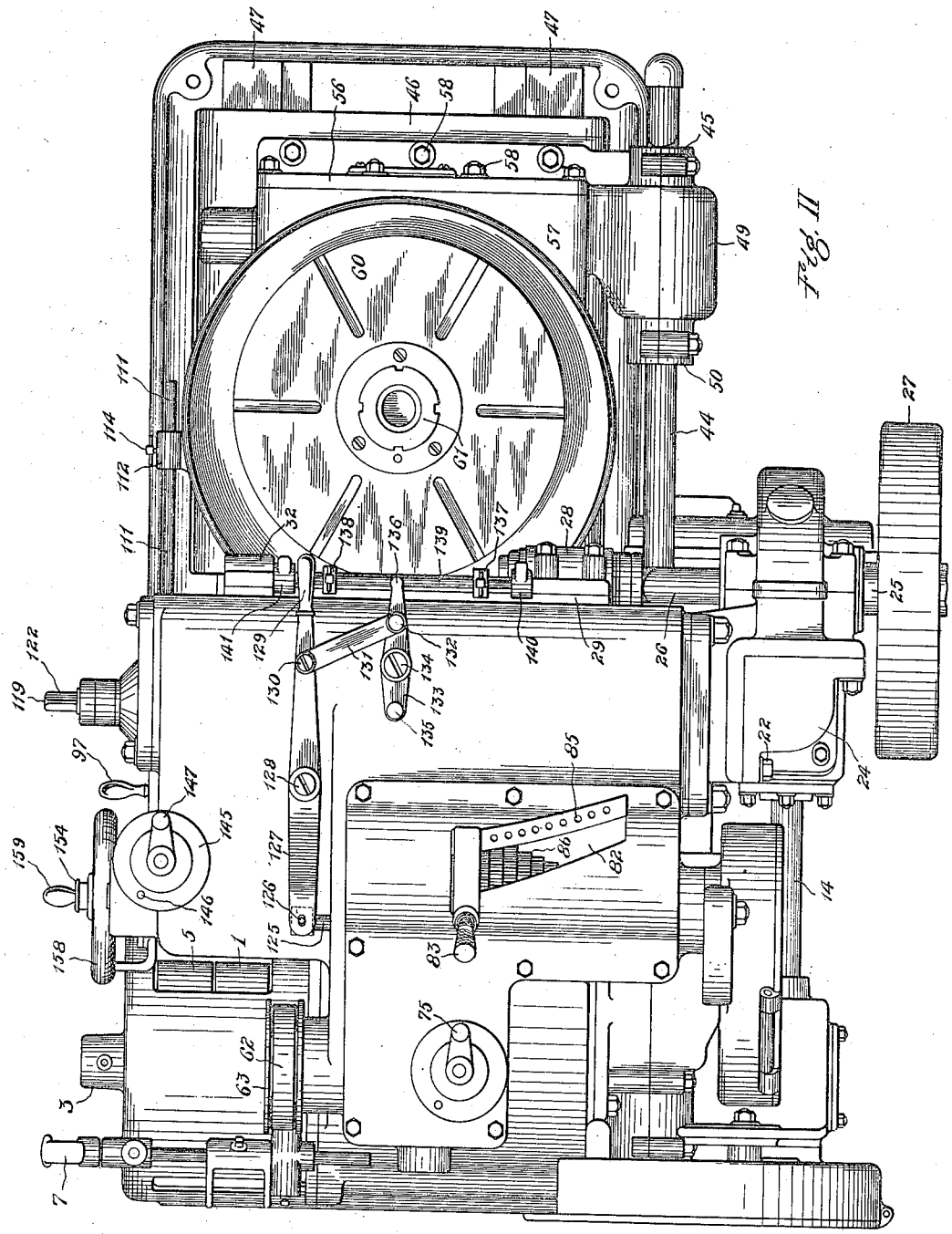

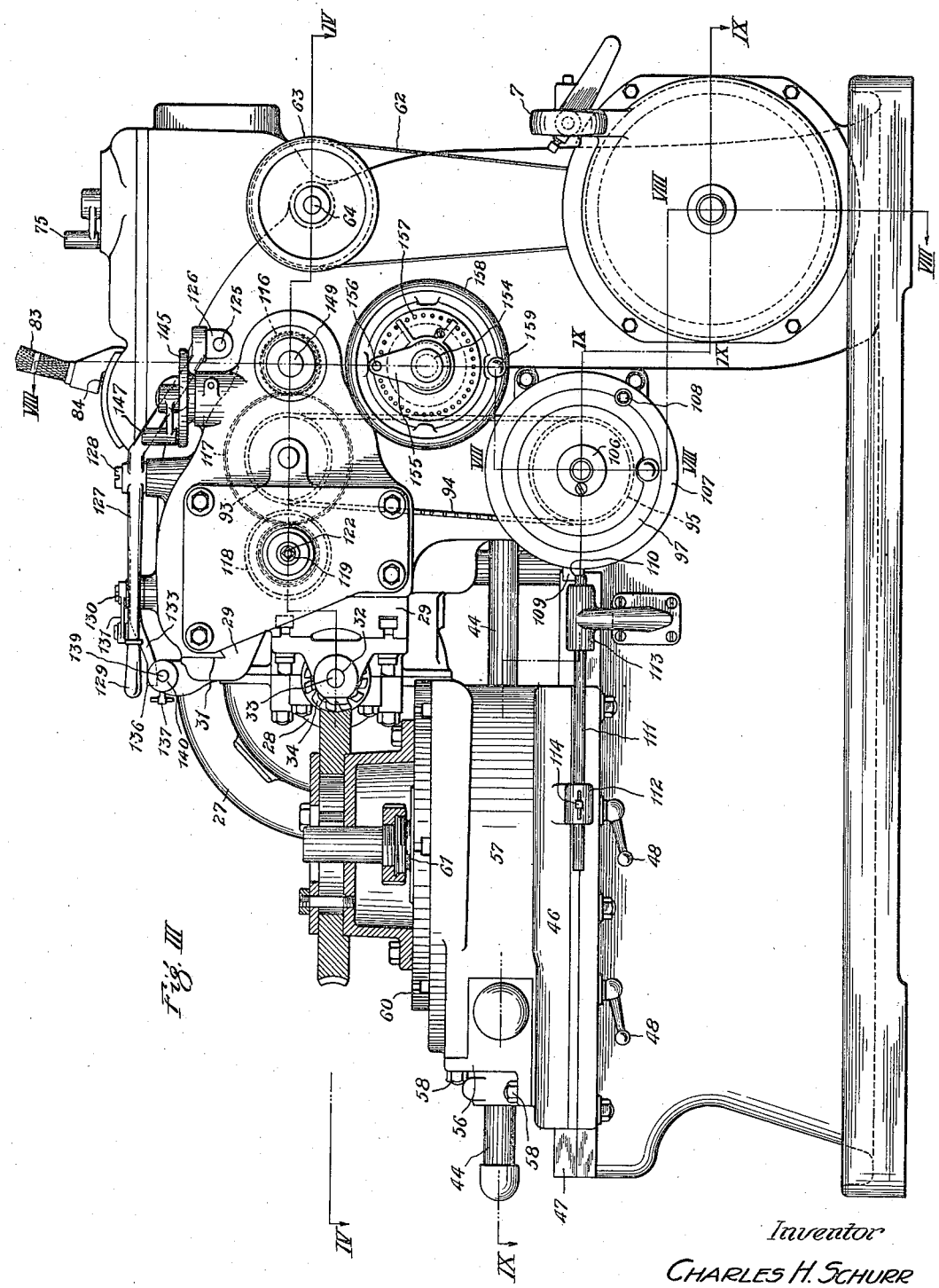

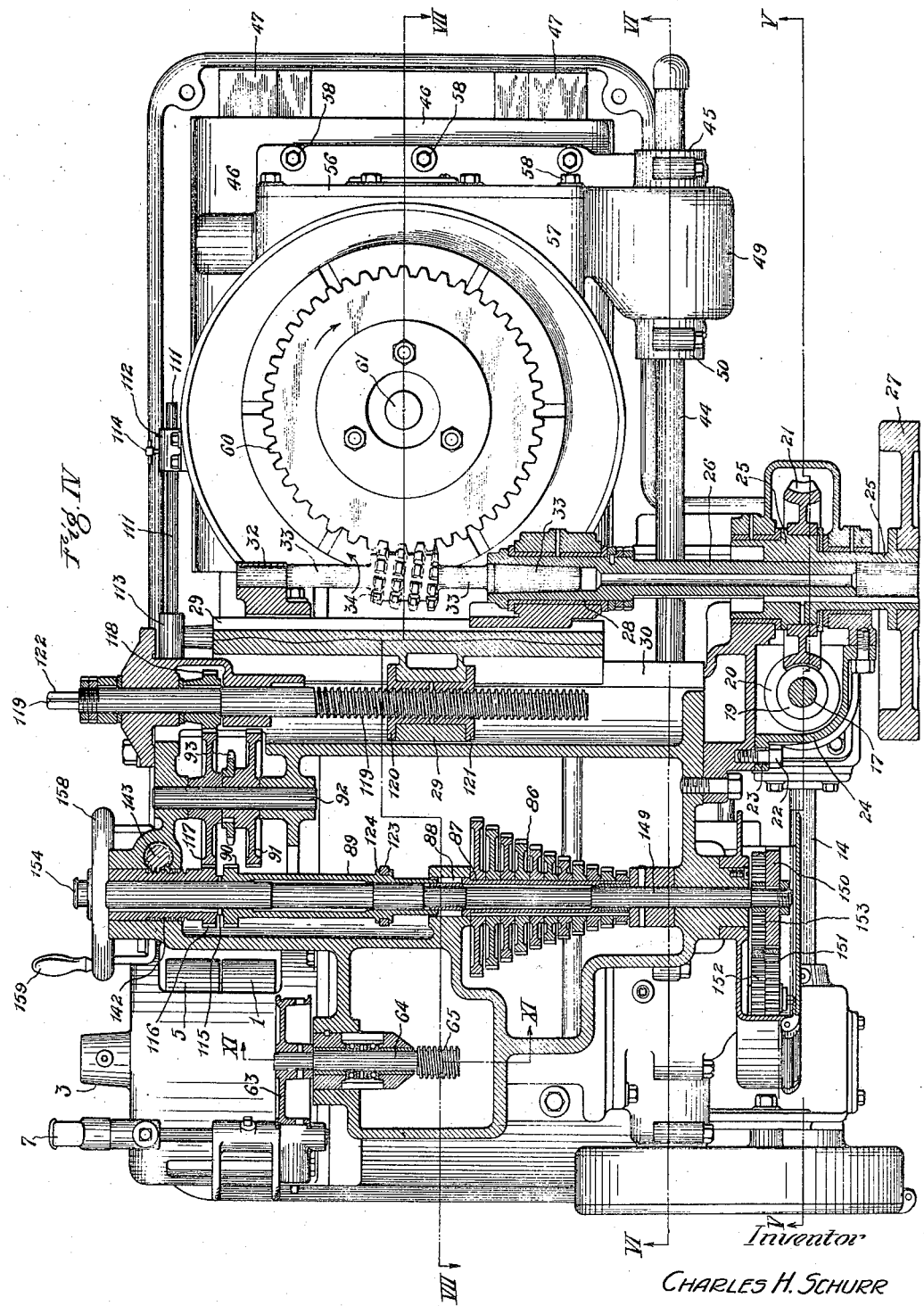

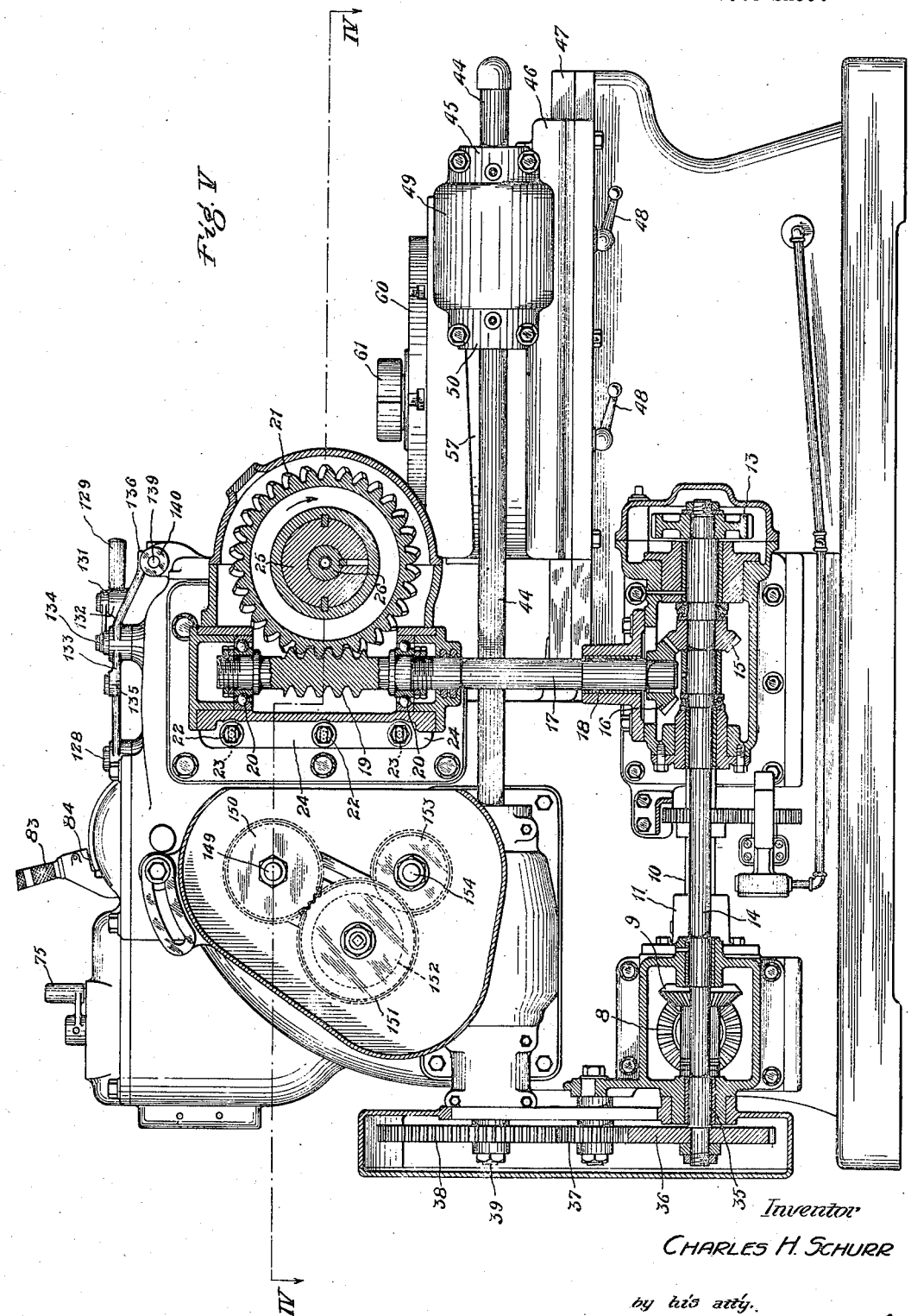

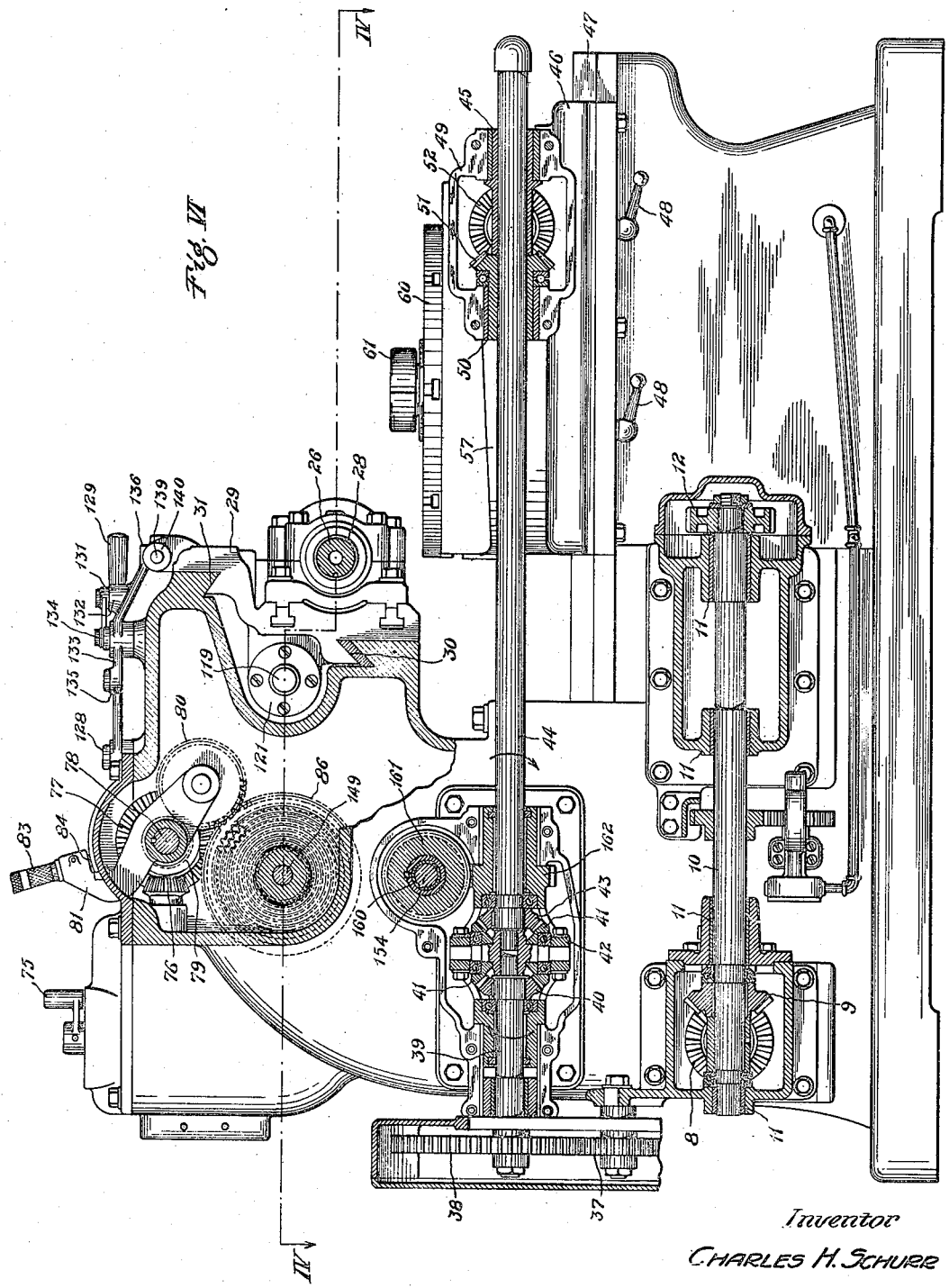

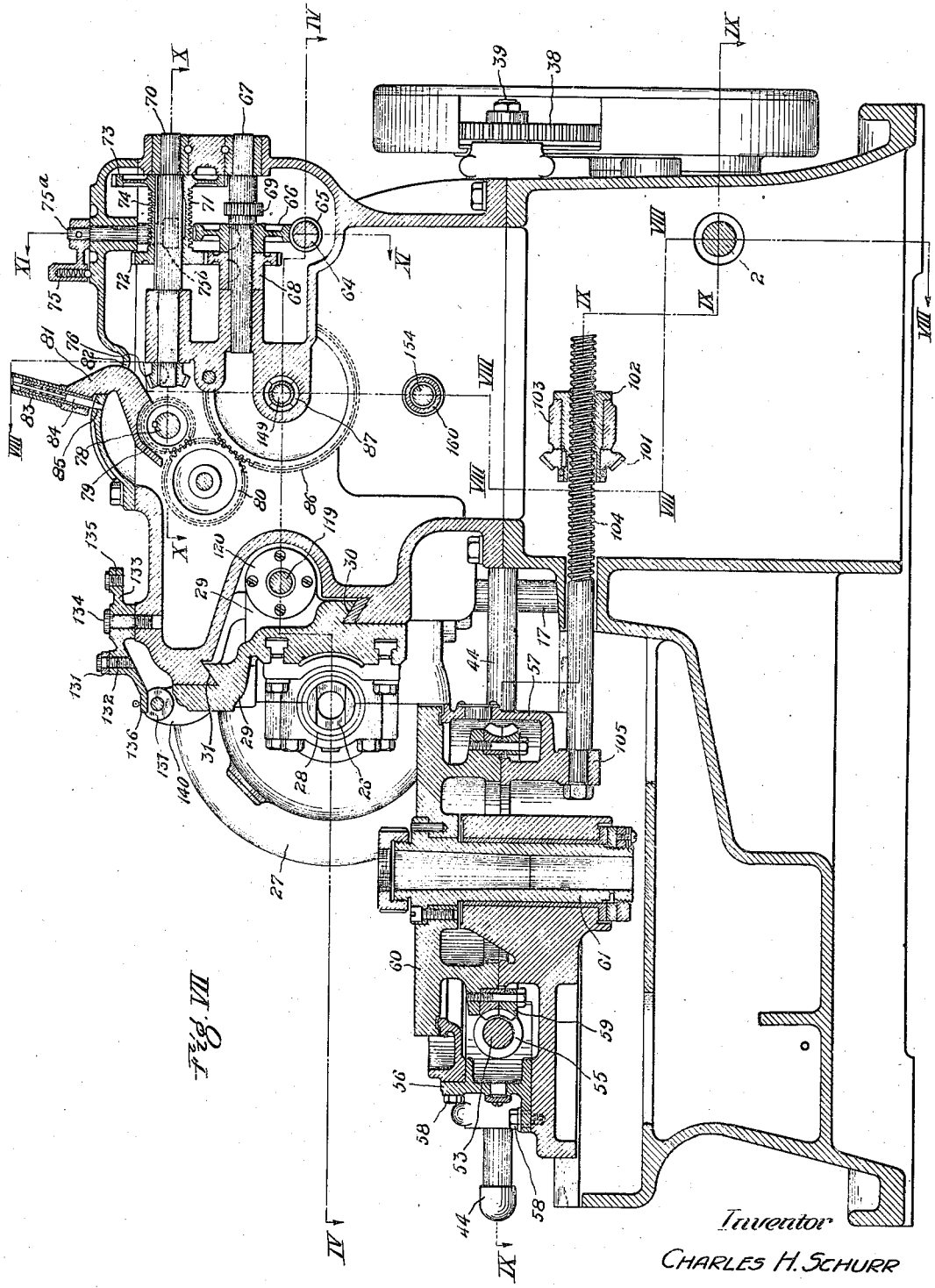

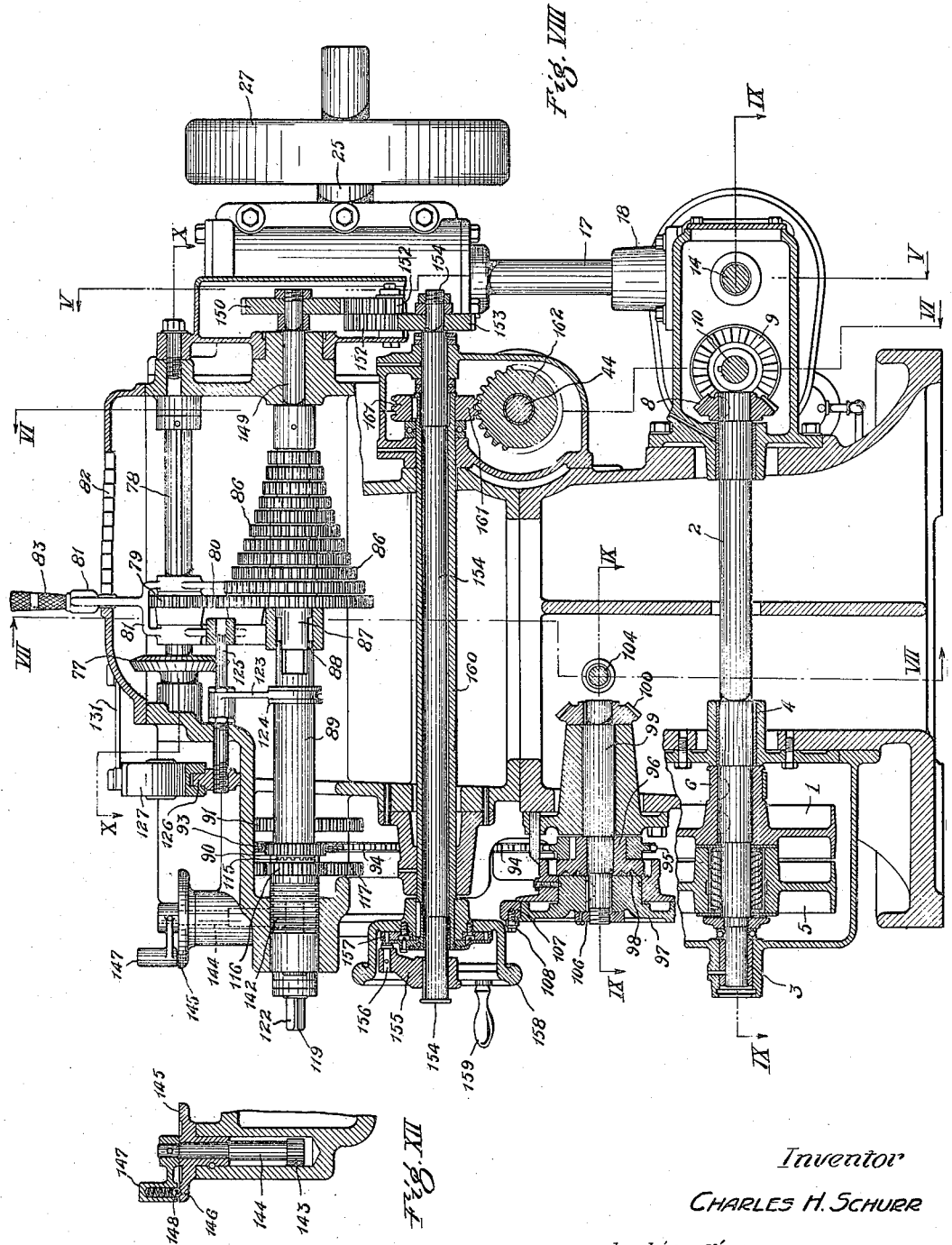

March 25, 1924.
C. H. SCHURR
1,487,895
WORM WHEEL GENERATING MACHINE
Filed July 3, 1919
10 Sheets-Sheet 10
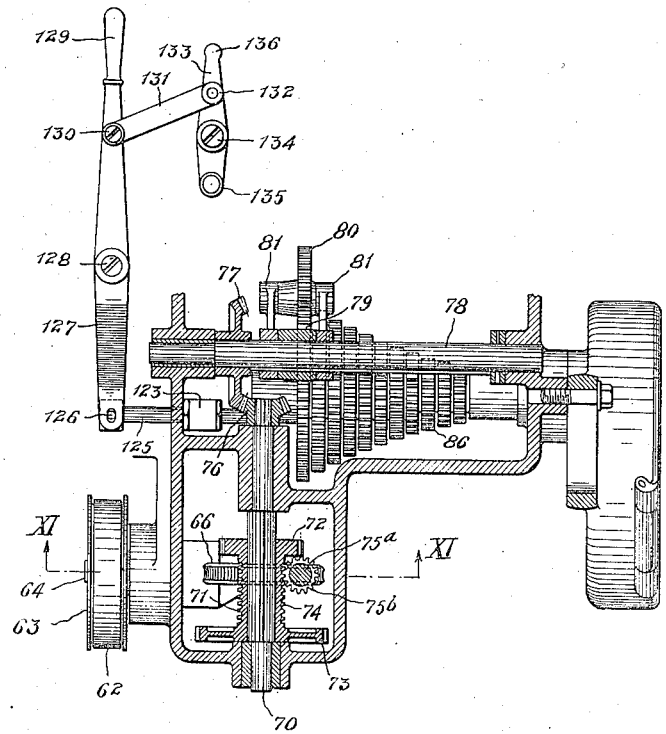
Fig. X
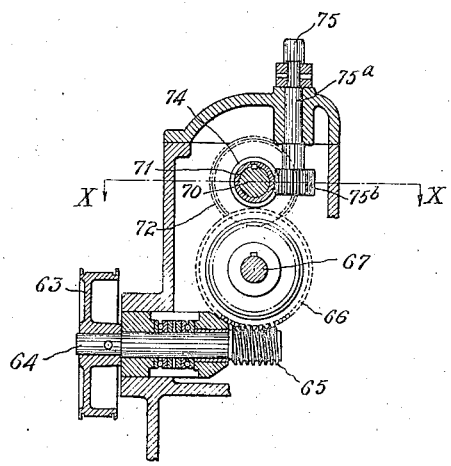
Fig. XI
Inventor
CHARLES H. SCHURR
by his atty.

Patented Mar. 25, 1924.

1,487,895

UNITED STATES PATENT OFFICE.

CHARLES H. SCHURR, OF CLEVELAND, OHIO, ASSIGNOR TO HOSEA T. BRADNER, OF CLEVELAND, OHIO.

WORM-WHEEL-GENERATING MACHINE.

Application filed July 3, 1919. Serial No. 308,633.

*To all whom it may concern:*

Be it known that I, CHARLES H. SCHURR, a citizen of the United States, residing at No. 3344 West 98th Street, in the city of Cleveland, county of Cuyahoga, and State of Ohio, have invented a new and useful Improvement in Worm-Wheel-Generating Machines, of which the following is a specification, the principle of the invention being herein explained, and the best mode in which I have contemplated applying that principle so as to distinguish it from other inventions.

This invention relates to gear generators and more particularly to a machine for generating worm gear wheel teeth.

In a machine of this character it is required that the blank be rotated, that the cutting tool or hob be rotated, that the ratio of these two rotating movements be established in predetermined harmony, and that there be a relative feed movement as between the blank and hob. The feed movement may be imparted either to the blank or to the tool or to both. Either a cylindrical or a tapered hob can be employed. According to the design of machine exemplified by the drawings herein, when a cylindrical hob is to be used, the blank is progressively fed perpendicularly toward the axis of the hob until the proper depth of cut is attained whereupon such feed movement automatically ceases. The speed of rotation of the blank is once around for a number of rotations of the hob depending upon the ratio of the threads in the hob to the teeth in the gear. The speed of rotation of the hob is quite independent of the number of teeth to be cut and is changed merely to suit the diameter of hob or the kind of material to be cut. When a tapered hob is employed, the final portion of the effective feed movement is accomplished by imparting an axial travel to the hob. Such additional or compounding movement of the hob must, however, be compensated for by correcting the correlation of the relative rotary movements of the blank and hob to suit. For this purpose differential compensating mechanism is provided for altering the rotational movement of the blank. All of the foregoing is common knowledge and practice in the art.

The objects of my invention are to provide:

1. A powerful machine, rigidly designed and compactly set up.

2. Facility in accomplishing a large number of speed changes, twenty-two feed speeds as exemplified.

3. Differential mechanism for imparting increment or decrement rotary motion to the work table according to and under the control of the axial feed movement of a tapered hob, so that whatever feed is used, the work and hob rotations continue in harmony.

4. Arrangement enabling work to be fed toward the tapered hob up to a given depth and thereafter substitute feed movement enabled by movement of the hob along its own axis.

5. Micrometer adjustment for establishing full depth position of work table relative to the hob and in asociation with such adjustment, either a manual or an automatic stop feature.

6. Contrivance for automatically stopping axial travel of the hob, which contrivance is also subject to manual control.

7. Indexing mechanism for initially locating the position of the blank to suit the hob teeth, either to catch the teeth when re-cutting, or when cutting a worm wheel with cast teeth, or when cutting a multiple threaded worm gear with a fly tool so that it is possible to properly index the change from one thread to the next.

8. Mechanism for taking up back-lash between work table worm and worm wheel drive without disturbing the alignment of the spline shaft owing to adjustment movement being made parallel to such shaft instead of sideways.

9. Hob axial movement along oblique slide ways one of which is nearly over the cutter so as to reduce vibration.

10. Mechanism so adapted that after completion of the worm gear, either the hob axial travel may be returned by itself or both the hob and blank may be returned to initial position so that no resetting is required for recutting.

11. Three take-up provisions for wear, viz:—in the cutter drive, in the blank drive and in the hob straight line travel screw connection.

12. Power actuation of hob in either direction along its own axis.

13. Mechanism for successive right angularly related feed movements.

14. Capability of sifting from one relative feed movement to a perpendicularly related feed movement without disturbing the harmonious blank and tool connection.

Adverting to the ten sheets of drawings:—

Fig. I is a front elevation of a worm gear generating machine embodying my invention.

Fig. II is a plan view of the same.

Fig. III is the right or operating side of the machine.

Fig. IV is a plan section on the line IV—IV of Figures III, VI and VII.

Fig. V is a vertical longitudinal section on line V—V of Figure IV.

Fig. VI is a vertical longitudinal section on line VI—VI of Figure IV.

Fig. VII is a vertical longitudinal section on line VII—VII of Figures IV and VIII.

Fig. VIII is a vertical cross section on line VIII—VIII of Figures III and VII.

Fig. IX is a plan section to show parts of various drives taken on lines IX—IX of Figures III, VII and VIII.

Fig. X is a fragmentary plan section on line X—X of Figures VII, VIII and XI.

Fig. XI is a fragmentary vertical section on line XI—XI of Figures IV, VII and X.

Fig. XII, appearing on the same sheets as Figure VIII, is a fragmentary vertical section through specific shifting mechanism.

According to the design of my machine all of the parts requiring manipulation during its operation are within reach of an operator standing along the right side of the machine as viewed in Figure I. The various controlling agencies are all to be found either at the right side of the machine or at its top.

In tracing the transmission of power for accomplishing the various required movements of the blank and cutter, the description will be simplified by omission to designate by reference characters some of the bed portions or fixtures in which the essential moving parts are appropriately mounted.

Directing attention first to Figure IX, power is taken from a single source consisting of the tight pulley 1 which is mounted on the main cross-directed driving shaft 2 mounted in suitable bearings 3 and 4 carried by the bed of the machine. Adjacent the tight pulley 1 on one side is the customary loose pulley 5 while on the other side is a small flanged pulley 6. A housing seen in Figures I to IV encloses the pulleys 1 and 5 to which the power belt is shifted by mechanism including the handle 7. The other end of the shaft 2 carries a bevel gear 8 which meshes with a similar gear 9 on a longitudinally extending shaft 10 mounted in three bearings 11. The further end of the shaft 10 projects beyond its proximate bearing and carries a gear 12 in engagement with a gear 13 upon a parallelly extending shaft 14. The gears 12 and 13 constitute change gears for which ready substitution may be made in order to regulate the speed of the cutter or hob.

Hob rotation.

Mounted on the horizontal shaft 14 is a bevel pinion 15 which is in mesh with a mating gear 16 carried by the lower end of a vertical shaft 17 as clearly appears in Figure V. The lower end of the shaft 17 is mounted in a bearing 18 whereas its upper end is fashioned as a worm 19 located between a pair of roller bearings 20. The worm 19 drives a worm gear 21 shown in Figures IV and V and the former may be adjusted toward the latter by loosening screws 22 passed through appropriate slots 23 in the support 24, the bearing at that end of the shaft 14 which is connected with the shaft 17 being first faced off and shimmed to enable doing so. The rotation of the worm 21 is communicated to a sleeve 25 having a spline connection with a cutter spindle 26 so that the latter is adapted for axial movement therethrough. The sleeve 25 has a rearwardly projecting end which carries a fly wheel 27. The forward end of the spindle is journaled at 28 in one of two relatively adjustable bearings formed in a cutter slide 29 movable crosswise of the machine and supported in V ways 30 and 31. These are aligned substantially at right angles to the diagonal resultant line of the component thrusts as will be understood by those who are skilled in the art upon inspection of Figure VI, thus reducing vibration, and obtaining the advantage that the component up thrust tightens the cling to the supporting surface. The cutter slide 29 is provided with a cutter spindle bearing 32 aligned with the sleeve 25 whereby the cutter spindle 33 may be rotatably mounted as is clearly shown in Figure IV. The cutter spindle 33 is fashioned with an integral hob 34 tapered toward the bearing 32 and therefore toward the operator's side of the machine. The hob 34 as illustrated is a left hand hob intended to be rotated through the train of gearing just described in the direction indicated by the arrow in Figure IV.

Blank rotation.

The rear end of the driving shaft 14 passes through a bearing 35 shown in Figure V and carries on its projecting end a gear 36 which is the first of a train of initial indexing change gears. The gear 36 engages with idler pinion 37 to rotate a gear 38 shown in Figures V and VI which is mounted on the projecting end of the short shaft 39 which at its opposite end drives a bevel pinion 40. This pinion 40 is part of a differential mechanism and meshes with two idlers 41 secured to a rotatable housing 42 as appears in Figure VI. In engagement with the opposite sides of the idlers 41 is a bevel pinion 43 which is mounted on the near end of spline shaft 44 axially aligned with the shaft 39 and extending to the front end of the machine where it is mounted in a suitable bearing 45 provided on a work carrying slide 46 longitudinally movable on ways 47 to which it may be fixed in various positions by means of binding devices including a pair of handles 48 on each side of the bed. The bearing 45 is supported by a suitable housing 49 which by reason of being indirectly in splined connection with the shaft 44 is enabled to be moved therealong. Also keyed to the shaft 44 within a suitable bearing 50 is a bevel pinion 51 which engages a gear 52 shown in Figures VI and IX. With these figures, Figure VII should also be viewed in order to trace the drive to the blank which will now be described. The gear 52 is keyed to a worm shaft 53 mounted in a pair of bearings 54 and fashioned in between as a worm 55. The bearings 54 are carried by an end cover 56 of a hollow casting 57 toward which the cover 56 may be adjusted by loosening retaining cap screws 58 and either varying the thickness of or removing the packing appearing as crosshatching therebetween in Figure IX or facing off the abutting surfaces. This adjustment of the end cover 56 longitudinally of the machine and along the shaft 44 is for the purpose of providing a take-up for wear between the worm 55 and a split worm wheel 59 which it is to drive. The worm gear wheel 59 is secured to a work holding table 60 rotatably mounted upon any approved type of spindle 61. The worm wheel blank may if small be centered by means of an arbor and if large a fixture to be secured to the chucking table 60 may be used to not only center the work, but to correctly locate its height with reference to the hob. It will be observed that by effecting the adjustment of the worm 55 toward the worm gear 59 in a longitudinal direction along the shaft 44 instead of crosswise as usually heretofore practiced, the alinement of the shaft 44 is not disturbed.

*Blank feed.*

Directing attention first to Figures IX, III, X and VII it is noticeable that power is taken from the flanged pulley 6 shown in Figure IX and transferred by means of the belt 62 to an upper pulley 63 as shown in Figure III. From such upper pulley 63 the transmission of power may be next followed by scrutiny of Figures IV, X and XI. The pulley 63 is mounted on a short shaft 64 with a projecting other end fashioned as a worm 65 which engages a worm wheel 66 on a shaft 67 as most clearly shown in Figure VII. Keyed to the shaft 67 is a gear 68 and fashioned integrally with the shaft 67 is a smaller gear 69. Mounted just above is another short shaft 70 surrounded by a keyed sleeve 71 formed with a gear 72 adapted to mesh with the gear 68 and also fashioned with a larger gear 73 adapted to mesh with the gear 69. It will be seen upon inspection of Figure VII that space is provided to allow for the axial displacement of the sleeve 71 along the shaft 70 whereby either the gears 68 and 72 may be engaged as appears in the drawing or else the gear 73 may be slid over so as to engage the gear 69. In this wise a two speed feed provision is had. Between the gears 72 and 73 the sleeve 71 is cut to circular rack form at 74. The shifting of the sleeve 71 is accomplished by moving a lever 75 on the top of the machine which turns a vertical shaft $75^a$ carrying on its lower end a pinion $75^b$ in mesh with the rack 74. The inner or forward end of the shaft 70 projects beyond its bearing and has keyed to it a bevel pinion 76 engaging a bevel gear 77 on a transverse spline shaft 78 seen in Figures VIII and X. Keyed to the shaft 78 is a gear 79 which drives a tumbler gear 80 carried by a forked extension from two collars slideable along the shaft 78 on opposite sides of the gear 79. The tumbler gear 80 is adapted to be swung about the shaft 78 as an axis and also to be moved along such shaft by a lever 81 which projects through an oblique opening 82 in the top of the machine which opening may be seen in Figure II. The outer end of the lever is fashioned as a handle 83 enclosing a reactingly mounted lock pin 84 as may be seen in Figure VII. The pin 84 is adapted to enter any one of a row of holes 85 arranged alongside of the slot 82. In this manner the tumbler gear 80 may be brought into engagement with any one of a cone of 11 feed change gears 86 shown in Figures IV and VIII. The gears 86 are fixed to a loose sleeve 87 having a long jaw tooth connection at 88 with another sleeve 89 the further end of which is fashioned as a gear 90. This gear is adapted to mesh with a gear 91 on a short shaft 92, best seen in Figure IV. In this figure the gears 90 and 91 are shown out of engagement because according to the location of the parts selected to be shown in the drawings the blank feed is to be assumed as having terminated preparatory to traveling the hob axially. The manner of disengaging the gear 90 by moving the sleeve 89 along its jaw tooth connection with the sleeve 87 will be later explained. The gear 91 is loose upon the shaft 92, but has keyed to it an upper or driving sprocket wheel 93. From the wheel 93 a chain 94 transmits power to a lower sprocket 95 as most clearly appears in Figures III and VIII. The rest of the mechanism for feeding the blank toward the cutter may be seen in Figure IX. The sprocket 95 is keyed to a collar 96 adapted to drive the hub of a hand wheel 97 frictionally through friction materials 98. The hub 97 is keyed to a shaft 99 carrying on its further end a bevel gear 100 which engages a bevel gear 101 secured to a nut 102 mounted in a fixed bearing 103 and operatively connected with a feed screw 104 which has its opposite end attached at 105 to a depending portion of the slide 46. As will be readily understood any rotational movement imparted to the nut 102 will act to move the screw 104 through it so as to enable the slide 46 and therefore the blank to be moved relative to the cutter, it being presumed of course that the binding handles 48 have been previously loosened. It is desirable to provide means for manipulating the blank relative to the tool and for this purpose the gear 90 is moved to the position shown in Fig. IV whereupon the hand wheel 97 may be turned to any position desired. This manifestly permits taking up wear between the friction surfaces 98. It is also desirable to provide a delicate adjustment whereby the distance between the centers of the blank and tool may be determined with precision within very small and definite limits. Accordingly, I have employed for this purpose a micrometer adjustment contrivance embodying the principle of domestic Patent #1,081,972 issued December 23, 1913 to E. J. Lees. Such contrivance not only permits of definitely establishing the distance between centers of the blank and tool, but of also automatically causing a cessation of the blank feed movement. When a cylindrical hob is employed the blank feed is automatically stopped after the cutter has reached its full depth. When a tapered hob is employed the blank feed is automatically stopped when the blank has been fed a distance toward the cutter enabling the latter to make a cut of only partial depth. Mechanism which will be later described also permits of manual control of the blank feed movement. Inasmuch as nothing is claimed for the micrometer adjustment it may be rather briefly described. The rim of the hand wheel 97 carries a ring 107 adapted to be locked thereto by means of a binding screw 108 shown in Figures III and VIII. The desired distance between centers of the blank and cutter and therefore the depth of cut to be effected having been previously determined the blank carrier is so set by turning the hand wheel 97 after it has been loosened from the ring 107. Such ring is provided with a stop 109, shown in Figures III and IX. After the blank carrier has been brought to the desired limit of its in-feed movement the stop 109 is swung loosely around the wheel 97 to the position in which it is shown in Figure III, that is to say, in engagement with the top of a projecting end 110 of a stop rod 111. The latter is adjustably mounted in a pair of aligned collars 112 and 113 which are fixed to the slide 46 and to the bed respectively. The position of the rod 111 is fixed by means of a clamp 114 which passes through the collar 112. The stop 109 and the extremity 110 being thus in engagement, the locking screw 108 is tightened in place and the hand wheel 97 reversed to effect the return movement of the blank carrier toward the front of the machine. During such reverse turning of the hand wheel 97 the stop 109 will first move upwardly away from the extremity 110 and just prior to its having completed one revolution, the slide 46 will have withdrawn the extremity 110 so as to permit the stop 109 to pass. Thereupon the blank carrier is moved forwardly enough to enable the blank to be mounted thereon. During this time the binding handles 48 are in their loosened position and remain so except when there is to be no movement of the blank toward or away from the cutter. As will now be readily understood by those skilled in the art when the automatic in-feed movement of the blank occurs the rod 111 will move slowly rearward in unison with the collar 112 on the slide 46 and through the collar 113 so as to presently reassume its obstructing position in the orbit of the stop 109. The latter will engage with the extremity 110 when the parts are in the precise position as before, thereafter over coming the friction between the surfaces 98 and automatically stopping the in-feed movement of the blank at its predetermined calculated position, the collar 96 meanwhile slipping around and rotation of the shaft 99 ceasing.

*Hob axial feed.*

As already stated, I consider it preferable when using a tapered hob to first feed the blank part way and to effect the concluding feed movement, after tightening the slide 46 to the bed by means of the handles 48, by traveling the hob along its own axis. Directing attention to Figures IV and VIII, it will be observed that the gear 90 has a short jaw clutch connection at 115 with a gear 116 in engagement with an idler gear 117 loosely mounted on the shaft 92. The idler 117 drives a pinion 118 keyed to a feed screw shaft 119 which is appropriately mounted in the cutter slide 29 so as to have threaded engagement with a two-piece bronze nut composed of the parts 120 and 121. These may be adjusted toward each other by facing off the surface areas where they have abutting engagement with the enclosing supporting portion of the slide 29. In this manner another take-up provision for wear is had. The outer end 122 of the screw shaft 119 is squared to enable attachment of a crank handle (not shown) through the agency of which the screw 119 may be turned by hand when and in the manner to be hereinafter explained.

Feed control.

I have designed the machine so that the mechanism for power feeding the blank may be disconnected, so that the mechanism for power feeding the cutter may be disconnected and so that such disconnections may be accomplished separately or simultaneously. Moreover, I have provided mechanism enabling such double feed control manually and automatically. Inspection of Figures IV, VIII and II will aid in making the following description understandable. As is shown in Figure IV and VIII, the sleeve 89 is axially shiftable and such movement is accomplished by means of a lever 123 encircling the sleeve 89 between a pair of collars 124. The upper end of the lever 123 is secured to a rod 125 slideably connected in a pair of holes formed in the frame of the machine as is clearly shown in Figure VIII. Articulating at 126 with an outer projecting end of the rod 125, as shown in Figures VIII, II, III and X is an upwardly bent lever 127 pivoted intermediately of its ends at 128. The free end of the lever 127 is fashioned with a handle 129. Articulating at a point 130 between the pivot 128 and the handle 129 is a link 131 the other end of which articulates at a point 132 with one extension of a lever 133 movable about a fixed pivot 134. The lever 133 is provided on the opposite side of its pivot with an alternative pivot point 135 which is the same distance from the pivot 134 as is the point 132. This arrangement enables the link 131 to connect either the points 130 and 132, as shown, or the points 130 and 135 which it would do in case a right hand hob were employed. The lever 133 has a free end 136 projecting beyond the point 132 into the path of reciprocal movement of a pair of stop collars 137 and 138 each of which is adjustably clamped to a rod 139, as may be seen in Figures I and II. The rod 139 is mounted on the top of the cutter slide 29 and extends cross-wise of the machine in which position it is secured in fixtures 140 and 141. When the rod 125 is moved to its inner-most position by pulling the handle 129 as far as it will go toward the operator's side of the machine the pinion 90 will be brought into engagement with the gear 91 as required when feeding the blank by power. Partial return movement of the rod 125 may shift the gear 90 to a neutral position out of engagement with the gear 91 and not yet in clutched engagement with the coaxial gear 116. When the gear 90 is in such neutral position both the blank power feed mechanism and the cutter power feed mechanism are disconnected. Either the blank or tool may, however, be still fed by hand the former by means of the hand wheel 97 and the latter by means of a crank to be applied at the squared end 122 of the screw shaft 119. When the rod 125 is withdrawn to the limit of its outward movement, the gears 90 and 116 become clutched together as shown in Figures IV and VIII. It is to be understood that the sleeves 87 and 89 are never rotatably disconnected. It will be remembered, that according to the exemplification of the drawings, a left hand hob is employed which is to be fed axially toward the operator's side of the machine. Therefore as the cutter slide 29 moves in the same direction the stop 137 will presently engage the extremity 136 to move the link 131 and therefore the pivot point 130 of the lever 126 in the same general direction thus moving the rod 125 inwardly to shift the sleeve 89 and hence to disengage the clutch 115. So the hob axial feed is automatically stopped.

It may not be amiss to mention that the axial travel of the hob by power may be reversed by merely crossing the belt 62. Ordinarily, the hob spindle is returned to its initial position by reverse turning with a crank applied to the squared end 122. In order to enable the reverse turning of the screw shaft 119 with a minimum of effort, I have provided mechanism for disengaging the gears 116 and 117 so that when the screw 119 is reversed only the pinion 118 and the idler 117 need be rotated. Figures IV and VIII disclose that the gear 116 is integral with a circular rack 142 adapted to be moved axially through the side of the machine by means of a device including a pinion 143 in engagement with the rack 142. This device is illustrated in detail in Figure XII. The pinion 143 will there be seen to be supported upon the lower end of a vertical shaft 144 projecting up through a circular surface 145 at the top of the machine. Such surface is provided with a pair of circumferentially disposed pockets 146 and one of which appears to view in Figure II and the other in Figure XII. The uppermost end of the shaft 144 is provided with a crank handle 147 which yieldingly carries a plunger 148 adapted to occupy either of the pockets 146 and when so doing to furnish the intelligence that the gears 116 and 117 are either full engaged or quite disengaged.

To return the hob spindle manually the operator ordinarily would disengage the gear 116 from the idler 117 by turning the handle 147. If this disengagement is not first made the hob spindle return movement would necessitate the turning of the change gears which, if they happen to be geared up, would require a considerable effort. Nevertheless, this is frequently done when it is desired to recut a blank that was first only roughly cut. In such a case the operator has the alternative of turning the hand wheel 158 which while requiring more revolutions offers less resistance. My machine permits of traveling the hob axially by hand with or without rotation of the compensating gears or in other words along with or independently of blank rotation. It is purposely not possible to have a power axial travel of the hob without effecting the blank rotational compensation to suit. This arrangement insures that the blank compensated rotation and power feed of the hob always start together. The machine does permit of blank feed by power and manually effected hob axial movement. I consider it decidedly advantageous that my machine permits of shifting from blank feed to hob feed without disturbing the harmonious blank and hob correlated rotations. These two operative parts are always positively connected. If it were possible to disconnect them, lost motion would subsequently occur and the harmonious compensating connection would be destroyed.

*Blank rotational compensation.*

When a tapered hob is fed axially the rotational movement of the blank must be compensatingly altered to suit, that is to say, must be rotated slightly faster in order to maintain the proper correlation required for a true generating engagement between the blank and tool. Inviting attention to Figure IV, it will be noticed that the gear 116 is keyed to a shaft 149 which extends entirely across the machine and passes through the sleeves 89 and 87. On its further end the shaft 149 carries a gear 150 adapted to drive compensating change gears 151 and 152, which in turn transmit power to a gear 153 on a lower shaft 154. The compensating selection of the change gears 151 and 152 is determined by the circumference of the worm gear to be cut but aside of that may remain the same irrespective of speed changes. The shaft 154 also extends across the machine and has its opposite end projecting out on the operator's side of the machine where it is in splined connection with an arm 155 shown in Figures III and VIII. This arm is therefore both rotatable with the shaft 154 and adapted to be slid therealong. The extremity of the arm 155 carries an inwardly projecting pin 156 adapted to be inserted in any one of a circumferential series of holes 157; such insertion being accomplished by pulling out the arm 155 until the pin 156 clears the face of the perforated disk and then turning the handle 159 of the hand wheel 158 to which the perforated disk is attached. Inasmuch as nothing is claimed for this construction the terse description just furnished should be adequate. The hand wheel 158 is keyed to a tube 160 surrounding the shaft 154 and carrying at its further end a rather large worm 161 shown in Figures VI and VIII. This worm drives a worm wheel 162 loose about the shaft 44 and secured to the rotatable housing 42. Accordingly, any rotation imparted to the worm wheel 162 imparts a differential rotary movement to the housing 42 and accordingly alters by just so much the rotation of the spline shaft 44 with reference to the rotation of the shaft 39. When no axial feed movement of the hob occurs and therefore no compensation in the rotary movement of the blank is desired the idlers 41 may turn without movement of the housing 42 because of the resistance offered to any tendency of the wheel 162 to reverse rotate the large diameter worm 161.

It should be clear that after first pulling out the arm 155, the hand wheel 158 may rotate the tube 160 independently of any movement of the shaft 154 so as to rotate the blank carrier to any desired position or in other words so as to properly index the blank. When the blank has been so indexed to a given position, the arm 155 is pushed in so that the shaft 154 and tube 160 are again locked together preparatory to effecting the hob feed. During the manual indexing of the blank, the shaft 39 will not turn because of the greater load back through the indexing train. Manifestly, there can be no compensatory blank rotation by power through the shaft 149 except when the effective power hob axial feed is occurring. At any other time the clutch 115 is thrown out, either by separating movement of the gear 90 or separating movement of the gear 116.

*Operation.*

The blank and tool rotations are started by shifting the handle 7. It may be assumed that the feed movement is to be imparted successively to the blank and cutter. The blank is to be fed perpendicularly toward the axis of the cutter by movement along with the slide 46 and at a predetermined rate of speed depending upon the selected speed changes either by adjustment of the handle 75 or by adjustment of the handle 83 or by adjustment of both. When the blank is to be so fed toward the cutter, the handle 129 must be pulled toward the operator's side of the machine thus moving the sleeve 89 in the opposite direction until the gear 90 engages with the gear 91. However, the gear 90 is first caused to occupy its neutral or inutile position preparatory to determination and effectuation of the proper distance between the center lines of the blank and tool. By turning the hand wheel 97, the blank carrier is manipulated toward the cutter as far as it is desired to have the blank subsequently fed automatically. Thereafter, the micrometer adjustment is made by superimposing the stop 109 upon the extremity 110 and then tightening the clamp 114 and also the screw 108. Next the hand wheel 97 is reversed so that the blank carrier is withdrawn sufficiently to enable the blank to be mounted thereon. Also prior to power actuation of the blank feed mechanism, any indexing of the blank by partial rotation in one direction or the other may be made by pulling out the arm 155 and rotating the tube 160 through the agency of the handle 159. During the feeding movement of the blank, it is necessary to correlate the rotations of the blank and cutter so that such movements are in predetermined generating harmony and such correlation is established by means of the usual indexing change gears 35 to 38 which will transmit the prescribed ratio of movement. The blank feed movement then continues until automatically stopped by engagement of the part 109 with part 110. When the operator notices this he first locks the slide 46 to the bed by tightening the handle 48 and then shifts the lever 129 to the other limit of its movement thereby successively moving the gear 90 past its neutral position and into clutching engagement with the gear 116 thus at once continuing the cutting operation by simultaneous actuation of both the hob axial feed mechanism and the compensating mechanism. The axial travel of the hob then continues until automatically arrested by engagement of the stop 137 with the finger 136 thus shifting the gear 90 back to its neutral position and effecting the disengagement of the clutch 115. After this, if there is to be no recutting operation the lever 147 is turned so as to withdraw the gear 116 out of mesh with the idler 117 and then returning the hob to its initial position by turning a crank applied to the squared end 122. If it is desired to recut the blank, the gears 116 and 117 are left in mesh and both the blank and hob returned to initial position either by turning the crank applied at the end 122 or by turning the hand wheel 159 while the arm 155 is locked to it so that both the shaft 154 and the tube 160 are reversed.

I claim:—

1. A worm gear wheel generating machine comprising a bed, a slide thereon, a blank carrier rotatably mounted upon said slide, another slide upon said bed, a hob rotatably mounted upon such second slide, a driving shaft, means connecting said shaft and hob for rotating the latter, means including indexing change gears for connecting said shaft and blank carrier to rotate the latter in predetermined harmony with the rotation of the hob, a feed driving member connected with said shaft, blank feed mechanism for actuating said blank carrying slide, hob feed mechanism, compensating mechanism adapted to connect said hob feed and blank rotation mechanisms, said compensating mechanism including a shaft having a projecting end and also including compensating change gears, a rotatable device adapted simultaneously to drive said hob feed and compensating mechanisms; said sleeve and device being connectable and dis-connectable with each other and with said blank and hob feed respectively.

2. A worm gear wheel generating machine comprising a bed, a slide movable forwardly and rearwardly thereon, a blank carrier rotatably mounted upon said slide, another slide movable crosswise upon said bed, a hob rotatably mounted upon such second slide, a driving shaft mounted across said bed, means connecting said shaft and hob for rotating the latter, means including indexing change gears at the rear for connecting said shaft and blank carrier to rotate the latter in predetermined harmony with the rotation of the hob, a feed driving sleeve connected with said shaft, blank feed mechanism for actuating said blank carrying slide and including a clutch couple, hob feed mechanism including a feed screw connected with said hob carrying slide, compensating mechanism adapted to connect said hob feed and blank rotation mechanisms and to compound the movement of one unit of the latter, said compensating mechanism including two shafts one having an end projecting crosswise of the machine and also including compensating change gears, a rotatable device adapted to slide along and rotate with the other of said compensating shafts to simultaneously drive said hob feed and compensating mechanisms, said sleeve and device being connectable and disconnectable with each other and with said blank and hob feeds respectively, and means for so alternatively actuating said sleeve and device.

3. A worm gear wheel generating machine comprising a bed, a slide reciprocable forwardly and rearwardly upon the front thereof, a blank carrier rotatably mounted upon said slide, another slide reciprocable crosswise upon said bed, a hob rotatably mounted upon such second slide, a driving shaft mounted across the rear end of said bed, means connecting said shaft and hob for rotating the latter, means including indexing change gears at the rear for connecting said shaft and blank carrier to rotate the latter in predetermined harmony with the rotation of the hob, change speed mechanism driven by said shaft, a feed driving sleeve connected with said mechanism, blank feed mechanism for actuating said blank carrying slide and including a clutch couple, hob feed mechanism including a feed screw connected with said hob carrying slide and having a projecting end, compensating mechanism adapted to connect said hob feed and blank rotation mechanisms and to impart a differential movement as between two units of the latter, said compensating mechanism including two shafts one having an end projecting on the same side as feed screw projection and also including compensating change gears, a gear clutch adapted simultaneously to drive said hob feed and compensating mechanisms, said sleeve loosely surrounding and movable along the other of said compensating shafts, said gear clutch being keyed to and slidable along the same shaft, said sleeve and gear clutch being movable into and out of engagement with each other and with said blank and hob feed mechanisms respectively, means for actuating said sleeve into or out of connection with said blank feed mechanism, and distinct means for actuating said clutch gear into or out of engagement with said hob feed mechanism, said means being together adapted to effect a driving relation between said sleeve and clutch gear only when the former is disconnected from the blank feed mechanism and the latter is connected with the hob feed mechanism.

4. A machine of the character described comprising a rotatably mounted hob, a rotatably mounted blank carrier, mechanism for effecting the travel of said hob along its own axis, said means including; a slide provided with a hole, a pair of nuts inserted in said hole and one provided with a flange abutting the bordering surface around one end of said hole and a screw operatively engaging said nuts, and mechanism for correlating the rotation of said blank carrier with regard to the movements of said hob, the length of the parts of said nuts enclosed by said hole being together less than the distance between the ends of the hole.

5. A machine of the character described comprising a rotatably mounted hob, a rotatably mounted blank carrier, mechanism for effecting the travel of said hob along its own axis, said means including; a slide provided with a hole, a pair of nuts inserted in said hole, and each provided with a flange abutting the bordering surfaces around the ends of said hole respectively, and a screw operatively engaging said nuts, and mechanism for correlating the rotation of said blank carrier with regard to the movements of said hob, the distance between the opposed surfaces of said flanges being less than the distance between the bordering surfaces at the ends of the hole, so as to permit the units to approach each other as a take-up for wear after facing off one or more of the abutting surfaces.

6. A worm gear wheel generating machine comprising the combination of a rotatable blank carrier, a rotary tool spindle, means for correlating the rotations of said blank carrier and tool spindle, distinct means for effecting a feed movement of each relatively to the other and manually operable means for simultaneously controlling either of such feed movements.

7. A worm gear wheel generating machine comprising the combination of a rotatable blank carrier, a rotary tool spindle, means for correlating the rotations of said blank carrier and tool spindle, a feed driving member, distinct mechanisms for imparting a feed movement to said blank and tool respectively, and a clutch for connecting or disconnecting either of said feed mechanisms with said feed driving member.

8. A worm gear wheel generating machine comprising the combination of a rotatable blank carrier, a rotary tool spindle, means for correlating the rotations of said blank carrier and tool spindle, a feed driving member, distinct mechanisms for imparting a feed movement to said blank carrier and tool respectively and a device for establishing driving relation between said member and one or the other of said distinct feed mechanisms or for rendering said feed driving member inoperative to transmit power to either of said mechanisms.

9. A worm gear wheel generating machine comprising the combination of a rotatable blank support a rotatable tool support, means for correlating said rotating movements, means for feeding one of said supports toward the other, means for feeding one of said supports at right angles to said first mentioned feed movement, a common feed driving member and a device adapted operatively to connect either of said feeding means with said member.

10. A worm gear wheel generating machine comprising the combination of a rotatable blank carrier, a rotatable tool spindle indexing change gears for correlating said rotating movements, means for feeding said blank carrier toward the tool spindle, means for feeding said tool spindle axially at right angles to said first mentioned feed movement axially, and a common feed driving member adapted to be operatively connected with either or neither of said feeding means.

11. A worm gear wheel generating machine comprising the combination of a rotatable blank carrier, a rotatable tool spindle, means for correlating said rotating movements, means including a gear for feeding said blank carrier perpendicularly to the tool spindle, means including a gear for feeding said tool spindle axially, a gear adapted to drive either of said first mentioned gears, and means for shifting said driving gear for such purpose.

12. A worm gear wheel generating machine comprising the combination of a rotatable blank support, a rotatable tool support, means for correlating said rotating movements, means for feeding one of said supports toward the other, means for feeding one of said supports at right angles to said first mentioned feed movement and a common feed driving member adapted to be operatively connected with either of said feeding means, means for so shifting the position of said member, and a device for moving the particular part of one of said feeding means with which said member is adapted to be operatively connected to a position beyond the range of movement of said member.

13. A worm gear wheel generating machine comprising the combination of a rotatable blank carrier, a rotatable tool, means for correlating said rotating movements, means for feeding said tool relative to the blank carrier, differential mechanism for compensating the rotational movement of said blank to suit said hob feed movement, and power transmitting mechanism including a member connected both with said feeding means and with said differential mechanism for the purpose specified.

14. A worm gear wheel generating machine comprising the combination of a rotatably mounted blank carrier, a rotatably mounted tapered hob, means for correlating said rotating movements, means for feeding said hob perpendicularly to the axis of said blank carrier so as to effect engagement therebetween, differential mechanism for compensating the rotational movement of said blank carrier to suit said hob feed movement, and power transmitting mechanism comprising two members, one of which is movable into and out of engagement with the other, one of which being adapted to be actuated to connect or disconnect said feeding means and said differential mechanism.

15. A worm gear wheel generating machine comprising the combination of a rotatably mounted blank carrier, a rotatably mounted tapered hob, means for correlating said rotating movements, mechanism for feeding said hob axially so as to effect engagement therebetween, differential mechanism for compensating the rotational movement of said blank carrier to suit said hob feed movement, mechanism for feeding said blank carrier toward the hob, power transmitting mechanism comprising two members, one of which is movable into and out of engagement with the other, one of which being furthermore adapted to actuate both said feeding means and said differential mechanism, and the other of which drives said blank feed mechanism or assumes an inutile position, whereby either the blank feed mechanism is actuated or else the hob feed mechanism and the compensating mechanism are actuated together, and means for effecting the engagement or disengagement of said members.

16. A worm gear wheel generating machine comprising the combination of a rotatably mounted blank carrier, a rotatably mounted tapered hob, means for correlating said rotating movements, mechanism for feeding said hob axially so as to effect engagement therebetween, differential mechanism for compensating the rotational movement of said blank carrier to suit said hob feed movement, mechanism for feeding said blank carrier toward the hob, power transmitting mechanism comprising two members, one of which is movable into and out of engagement with the other, one of which being furthermore adapted to actuate both said feeding means and said differential mechanism, and the other of which drives said blank feed mechanism or assumes an inutile position, and means for effecting the engagement or disengagement of said members, whereby to either simultaneously drive said hob feed and compensating mechanisms or else said blank feed mechanism or else none of said mechanisms respectively.

17. A machine of the character described comprising a bed, a blank carrier rotatably mounted thereon, a hob rotatably mounted on said bed, power means for rotating said blank carrier and hob in predetermined generating harmony, power feed mechanisms together including a pair of pulleys, and a belt connectable with said pulleys and adapted to transmit power from one to the other when actuated in reversed directions whether said belt is straight or crossed.

18. A machine of the character described comprising a bed, a blank carrier rotatably mounted thereon, a hob rotatably mounted on said bed, power means for rotating said blank carrier and hob in predetermined generating harmony, said means including a pulley, power feed mechanism including another pulley and a belt connecting it with said first mentioned pulley and adapted to rotate it in either direction depending upon a straight or crossed application of said belt.

19. A machine of the character described comprising a bed, a blank carrier rotatably mounted thereon, a hob rotatably mounted on said bed, power means for rotating said blank carrier and hob in predetermined generating harmony and power feed mechanism including a set of feed change gears, a cone of gears, and a tumbler gear adapted to engage any gear of said cone of gears, means for bringing different pairs of said feed change gears into mesh, and means for shifting said tumbler gear to engage a particular gear of said cone of gears.

20. A machine of the character described comprising a bed, a blank carrier rotatably mounted thereon, a hob rotatably mounted on said bed, power means for rotating said blank carrier and hob in predetermined generating harmony, and power feed transmitting mechanism including a gear capable of additional movement along its own axis, blank feed mechanism and hob feed mechanism each including a gear in position to be alternatively engaged by said axially movable gear.

21. A machine of the character described comprising a bed, a blank carrier rotatably mounted thereon, a hob rotatably mounted on said bed, power means for rotating said blank carrier and hob in predetermined generating harmony, and power feed transmitting mechanism including a pair of members rotatably connected so as to be axially displaceable, one of said members carrying a gear, hob feed mechanism including a gear so mounted as to be capable of movement distinct from its rotary movement and adapted to assume a position to be engaged by said axially movable gear, and means for moving said hob feed mechanism gear beyond the range of movement of said axially movable power transmitting gear.

22. A machine of the character described comprising a bed, a blank carrier rotatably mounted thereon, a hob rotatably mounted on said bed, power means for rotating said blank carrier and hob in predetermined generating harmony and power feed transmitting mechanism including a pair of aligned sleeves rotatably connected so as to be axially displaceable, one of said sleeves carrying a gear, blank feed mechanism and hob feed mechanism each including a gear in position to be engaged by said axially movable gear, and means for moving said gear carrying sleeve either into engagement with one of said feed mechanism gears or to a neutral position therebetween.

23. A machine of the character described comprising a bed, a blank carrier rotatably mounted thereon, a hob rotatably mounted on said bed, power means for rotating said blank carrier and hob in predetermined generating harmony, power transmitting mechanism including three axially aligned sleeves, one of said sleeves carrying a gear, the middle one of said sleeves having a clutch connection with each of the others and being likewise surrounded with gear teeth, distinct blank and hob feed mechanisms each including a gear adapted to be engaged by one of the sleeve gears, and means for moving said middle sleeve, the arrangement being such that its connection with said gear carrying sleeve is broken whenever its own gear engages with one of said feed mechanism gears.

24. A machine of the character described comprising a bed, a blank carrier rotatably mounted thereon, a hob rotatably mounted on said bed, power means for rotating said blank carrier and hob in predetermined generating harmony, power transmitting mechanism including three axially aligned sleeves, one end of one of said sleeves being connected with the source of power, the other end carrying a gear, the middle one of said sleeves having a clutch connection with each of the others and carrying a gear, distinct blank and hob feed mechanism each including a gear adapted to be engaged by one of the sleeve gears, and means for moving said middle sleeve, the arrangement being such that its connection with said gear carrying end sleeve is broken whenever its own gear engages with one of said feed mechanism gears, a shaft passing through all of said sleeves and driven by one of them, and differential compensating mechanism connecting said shaft and a power blank rotational part.

25. A machine of the character described comprising a bed, a blank carrier rotatably mounted thereon, a hob rotatably mounted on said bed, means including indexing change gears and differential idlers for correlating the rotations of said blank carrier and hob, said differential mechanism including a rotatable housing supporting said idlers, a shaft, a driving sleeve splined to said shaft so as to be capable of rotating the same and sliding therealong, mechanism for feeding the hob along its own axis and adapted to be connected with said sleeve, compensating mechanism connecting said shaft and differential housing, and means for sliding said sleeve to break its connection with said feed mechanism.

26. A machine of the character described comprising a bed, a blank carrier rotatably mounted thereon, a hob rotatably mounted on said bed, means including indexing change gears and differential idlers for correlating the rotations of said blank carrier and hob, said differential mechanism including a rotatable housing supporting said idlers, power transmitting mechanism comprising a pair of members, one of which is movable into and out of engagement with the other, mechanism for feeding the hob along its own axis and adapted to be connected with one of said members, compensating mechanism connecting the last mentioned member with said differential housing, mechanism adapted to be controlled by the operator for actuating said movable member out of engagement whereby both hob feed mechanism and compensating mechanism are disconnected from the power source.

27. A machine of the character described comprising a bed, a blank carrier rotatably mounted thereon, a hob rotatably mounted on said bed, means including indexing change gears and differential idlers for correlating the rotations of said blank carrier and hob, said differential mechanism including a rotatable housing supporting said idlers, power transmitting mechanism comprising a pair of members, movable into and out of engagement with each other, mechanism for feeding the hob along its own axis and adapted to be connected with one of said members, compensating mechanism connecting the last-mentioned member with said differential housing, a device for actuating said movable member out of engagement whereby both hob feed mechanism and compensating mechanism are disconnected from the power source, mechanism for feeding the blank toward the hob and adapted to be connected with the other of said members only when the latter is disconnected from the hob feed transmitting member, and a device for actuating the blank feed transmitting member out of one of its connections, one of said devices being subject to automatic actuation.

28. A machine of the character described comprising a bed, a blank carrier rotatably mounted thereon, a hob rotatably mounted on said bed, power means for rotating said blank carrier and hob in perdetermined generating harmony, a rotatably mounted driving sleeve, blank feed mechanism operatively connected with said sleeve, a shaft driven by said sleeve and connected with said power means for rotating said blank carrier, and means for breaking such last mentioned connection.

29. A machine of the character described comprising a bed, a blank carrier rotatably mounted thereon, a hob rotatably mounted on said bed, power means for rotating said blank carrier and hob in predetermined generating harmony, a rotatably mounted driving sleeve, hob feed mechanism, operatively connected with said sleeve, differential compensating mechanism connecting said sleeve with said power means for varying the correlated rotations of said blank carrier and hob, to suit the hob feed, and means including a hand wheel for breaking said compensating connection whereby to enable indexing of the blank carrier.

30. A machine of the character described comprising a bed, a blank carrier rotatably mounted thereon, a hob rotatably mounted on said bed, power means for rotating said blank carrier and hob in predetermined generating harmony, a rotatably mounted and additionally movable driving sleeve, blank feed mechanism and hob feed mechanism, said sleeve being movable into connection with either of said mechanisms, differential compensating mechanism connecting said sleeve with said power means for varying the correlated rotations of said blank carrier and hob to suit the hob feed, and distinct means for breaking said power compensating connection at a plurality of places.

31. A machine of the character described comprising a bed, a blank rotatably mounted thereon, a hob rotatably mounted on said bed, means for rotating said blank and hob in predetermined generating harmony, feed transmitting mechanism including a slidably and rotatably mounted gear, hob feed mechanism including a gear in position to engage said slidable gear, and means for sliding the latter into or out of engagement with said blank feed gear.

32. A machine of the character described comprising a bed, a blank rotatably mounted thereon, a hob rotatably mounted on said bed, means for rotating said blank and hob in predetermined generating harmony, feed transmitting mechanism including a slidably and rotatably mounted gear, feed mechanism including a gear in position to be engaged and driven by said slidable gear, and automatically operated means for sliding the latter to one of its alternative positions.

33. A machine of the character described comprising a bed, a blank carrier rotatably mounted thereon, a hob rotatably mounted on said bed, means for rotating said blank carrier and hob in predetermined generating harmony, feed transmitting mechanism including a slidably and rotatably mounted part, hob feed mechanism including a hob carrying slide and a part in position to be engaged and driven by said slidable part, and automatically operated means for sliding the latter to either one of its alternative positions, said automatic means including a member connected with said part and in position to be engaged by a stop on said slide.

34. A machine of the character described comprising a bed, a blank carrier rotatably mounted thereon, a hob rotatably mounted on said bed, means for rotating said blank and hob in predetermined generating harmony, feed transmitting mechanism including engageable friction surfaces, and automatically operating means for obstructing the movement of a part of said mechanism after a predetermined progression of feed movement and compelling the slip of said friction surfaces.

35. A machine of the character described comprising a bed, a blank carrier rotatably mounted thereon, a hob rotatably mounted on said bed, means for rotating said blank carrier and hob in predetermined generating harmony, feed transmitting mechanism including engageable driving and driven friction surfaces, means for controlling the proximity of said surfaces to each other, and means for manipulating one independently of the other for adjusting the distance between centers of the blank and tool.

36. A worm gear wheel generator comprising a bed, a blank carrier rotatably mounted thereon, a slide reciprocably carried by said bed, a tapered hob rotatably mounted on said slide, mechanism for traveling said slide parallel to the axis of said hob comprising three members, one of which is movable into and out of engagement with each of the others, means for actuating said movable member, said mechanism also comprising a feed screw adapted to be reversely rotated independently of any movement of one of said members when said movable member is actuated to its doubly disengaged position.

37. A worm gear wheel generator comprising a bed, a blank rotatably mounted thereon, a slide reciprocably carried by said bed, a tapered hob rotatably mounted on said slide, power actuated mechanism for traveling said slide parallel to the axis of said hob comprising two members, one of which is movable into and out of engagement with the other, differential compensating mechanism connected with one of said members for altering the rotation of said blank to suit the axial travel of the hob, and means for disengaging said members whereby to enable the return of both hob and blank to initial position preparatory to recutting without necessitating resetting.

38. A worm wheel generator comprising a bed, a blank carrier rotatably mounted thereon, a cutter slide reciprocably carried by said bed, a tapered hob rotatably mounted on said slide, power actuated mechanism for travelling said slide parallel to the axis of said hob comprising three members, two of which are movable into and out of engagement with each other and one of which is additionally movable out of engagement with both of the others, differential compensating mechanism connected with one of said members for altering the rotation of said blank carrier to suit the axial travel of the hob, automatically operating means for separating one pair of said members whereby to enable the return of both hob and blank carrier to initial position preparatory to recutting without necessitating resetting, and means for separating the other of said members from both of the remaining to enable return of the hob.

39. In a machine of the character described, the combination of a frame, a tool mounted for rotatable and axial movement thereon, a slide, a blank carrier rotatably mounted on said slide, tool feed mechanism for traveling said tool axially, blank feed mechanism for traveling said blank carrier toward the tool, a driving member, and a clutch device for connecting or disconnecting either of said feed mechanisms with said driving member.

40. In a machine of the character described, the combination of a frame, a tool mounted for rotatable and axial movement thereon, a blank carrier rotatably and slidably mounted on said frame, mechanism for correlating said rotational movements, tool feed mechanism for traveling said tool axially, differential compensating mechanism for altering said blank carrier rotation, blank feed mechanism for traveling said blank carrier toward the tool, a driving member, and a clutch device for either connecting one of said feed mechanisms with said driving member, or for simultaneously connecting the other of said feed mechanisms and said compensating mechanism with said driving member.

41. In a machine of the character described, the combination of a frame, a tool slide thereon, a tool rotatably mounted in said slide, a blank carrying slide, a blank carrier rotatably mounted thereon, mechanism for rotating said blank carrier and tool in predetermined ratio, mechanism for actuating said tool slide so as to feed said tool tangentially to the periphery of the blank, a driving member, and a clutch subject to the control of the operator for connecting both of said mechanisms with said driving member or disconnecting both of said mechanisms from said driving member.

42. In a machine of the character described, the combination of a frame, a tool slide thereon, a tool rotatably mounted in said slide, a blank carrier rotatably mounted on said frame, mechanism for rotating said blank carrier and tool in predetermined ratio, mechanism for actuating said tool slide so as to feed said tool tangentially to the periphery of the blank, a driving member, a clutch subject to the double control of the operator for either connecting both of said mechanisms with said driving member or simultaneously disconnecting both of said mechanisms from said driving member and from each other, and manually operable means for actuating said tool slide after such simultaneous disconnection.

43. In a machine of the character described, the combination of a frame, a tool slide thereon, a tool rotatably mounted in said slide, a rotatably mounted blank carrier, mechanism for rotating said blank carrier and tool in predetermined ratio, mechanism for actuating said tool slide so as to feed said tool tangentially to the periphery of the blank, a driving member, a clutch couple subject to the double control of the operator for either connecting both of said mechanisms with said driving member or simultaneously disconnecting both of said mechanisms from said driving member and from each other, and manually operable means for actuating said tool slide by itself after disconnection of said mechanisms from each other and for also actuating both mechanisms after their simultaneous disconnection from said driving member, but not from each other.

44. In a machine of the character described, the combination of a frame, a tool slide thereon, a tool rotatably mounted in said slide, a rotatably mounted blank carrier, mechanism for rotating said blank carrier and tool in predetermined ratio, mechanism for actuating said tool slide so as to feed said tool tangentially to the periphery of the blank, a driving member, a clutch couple subject to the double control of the operator for either connecting both of said mechanisms with said driving member or simultaneously disconnecting both of said mechanisms from said driving member and from each other, and a distinct clutch device comprising a hand wheel and constituting a part of said mechanism for rotating said blank carrier in predetermined ratio, said hand wheel being adapted to actuate both mechanisms when the clutch device is in one position and the mechanisms are disconnected from said driving member, and being adapted when the clutch device is in its other position to actuate only a part of said blank rotating mechanism thereby enabling the indexing of the blank.

45. In a machine of the character described, the combination of a frame, a work carrier mounted for rotatable and reciprocating movement thereon, a tool spindle mounted for rotatable and reciprocating movement on said frame, a driving member, mechanism for feeding said work carrier, mechanism for feeding said tool spindle, and a single control device for connecting either of said feed mechanisms with said driving member.

46. In a machine of the character described, the combination of a frame, a work carrier mounted for rotatable movement thereon, a tool spindle mounted for rotatable and reciprocating movement on said frame, a driving member, means for rotating said work carrier at a predetermined rate of speed, mechanism for feeding said tool spindle, compensating work carrier rotation mechanism adapted to be actuated together with said tool feed mechanism, and a device for simultaneously controlling the connection of said mechanisms with said driving member whereby both mechanisms must start and stop together.

47. In a machine of the character described, the combination of a frame, a work carrier mounted for rotatable movement thereon, a tool spindle mounted for rotatable and reciprocating movement on said frame, a driving member, mechanism for traveling said tool axially, mechanism for varying the distance between centers of said work and tool, means including a series of parts for rotating said work carrier and tool in proper generating harmony, and a clutch for connecting either of said mechanisms with said driving member without disconnecting any of said series of parts.

48. A worm gear wheel generating machine comprising a frame, a work carrier mounted for rotatable and straight line travel thereon, a tool spindle mounted for rotatable and straight line travel upon said frame, means for rotating said work carrier and tool spindle, mechanisms for accomplishing the travel of said carrier and spindle, respectively, and a speed change appliance adapted to be connected with either of said travel mechanisms.

49. A worm gear wheel generating machine comprising a frame, a work carrier mounted for rotatable and reciprocable travel thereon, a tool spindle mounted for rotatable and axial travel upon said frame, means for rotating said work carrier and tool spindle, mechanisms for accomplishing the travel of said carrier and spindle, respectively, a driving member adapted to be connected with either of said travel mechanisms, a cone of gears rotatably connected with said driving member, and a power actuated gear adapted to engage any one of the gears in said cone.

50. A worm gear wheel generating machine comprising a frame, a work carrier mounted for rotatable and reciprocable travel thereon, a tool spindle mounted for rotatable and axial travel upon said frame, means for rotating said work carrier and tool spindle, mechanisms for accomplishing the travel of said carrier and spindle, respectively, a driving member, a clutch adapted to connect either of said travel mechanisms with said driving member, a cone of gears rotatably connected with said driving member, a shaft parallel to the axis of said cone, a tumbler rotatably connected with said shaft, means including a lever supporting said tumbler gear and adapted to swing it about or move it along said shaft for connecting said tumbler gear with any of said cone of gears, and additional speed change gears for determining the rate of rotation of said shaft.

51. A worm gear wheel generating machine comprising the combination of a bed, a rotatably mounted blank carrier, a rotatably mounted hob, a slide on said bed supporting one of said rotatable parts, feed mechanism for actuating said slide and a feed driving couple one of which is movable into or out of connection with said feed mechanism and the other of which is movable into and out of engagement with the first when in a certain position and distinct means for actuating the units of said couple, respectively.

52. A worm gear wheel generating machine comprising the combination of a bed, a slide thereon, a blank carrier rotatably mounted on said slide, another slide mounted on said bed, a hob rotatably mounted upon said last mentioned slide, distinct feed mechanisms for actuating said slides, respectively, a common feed driving structure capable of displacement and of being alternatively connected with each of said feed mechanisms, and driving mechanism for correlating the rotations of said blank carrier and hob and including a member connected with said hob feed mechanism whenever said feed driving structure and hob feed mechanism are connected.

53. A worm gear wheel generating machine comprising the combination of a bed, a slide thereon, a blank carrier rotatably mounted on said slide, another slide mounted on said bed, a hob rotatably mounted upon said last mentioned slide, a shaft, distinct feed mechanisms for actuating said slides, respectively one of which includes a part rotatable with and slidably mounted in said shaft, a common feed driving structure loose upon said shaft and capable of movement therealong and of being alternatively connected with said part or with one end of the other of said feed mechanisms, mechanism connected with said part for correlating the rotations of said blank carrier and hob, and a device for actuating said structure to effect its connection with or disconnection from either of said feed mechanisms.

54. A machine of the character described comprising a bed, a blank carrier rotatably mounted thereon, means for rotating said blank carrier, a hob rotatably mounted on said bed, means for rotating said hob, mechanism for correlating the rotations of said blank carrier and hob, mechanism for feeding one of said rotatable parts toward the other, said hob rotating means including a pair of nuts and a screw passed therethrough, said nuts being spaced apart along said screw, and means for holding them in such position.

55. A machine of the character described comprising a bed, a blank carrier rotatably mounted thereon, means for rotating said blank carrier, a hob rotatably mounted on said bed, means for rotating said hob, mechanism for correlating the rotations of said blank carrier and hob, means for effecting a relative feed movement between blank and hob, said mechanism including a worm gear and worm wheel gear, and means for adjusting one of said gears relative to the other.

56. A machine of the character described comprising a bed, a blank carrier rotatably mounted thereon, means for rotating said blank carrier, a hob rotatably mounted on said bed, means for rotating said hob, mechanism for correlating the rotations of said blank carrier and hob, mechanisms for effecting a relative feed movement between blank carrier and hob, said hob rotating means including a worm and worm wheel, and means for adjusting said worm relative to the worm wheel, said hob rotating means also including a shaft and bevel gear units, one of said units adjustable in the same direction as said worm adjustment so as to maintain proper driving relationship with the other unit.

57. A machine of the character described comprising a bed, a slide thereon, a blank carrier rotatably mounted on said bed, a slide mounted on said bed, a hob rotatably mounted on said slide, means for rotating said hob, feed mechanism for actuating said slide, mechanism including a shaft for correlating the rotation of said blank carrier according to its diameter and the travel of said slide, with reference to the rotation of said hob, said correlating mechanism including a pair of aligned shafts, a rotatable housing and idlers revolubly mounted upon said housing and operatively geared to said shafts, respectively, distinct driving means for rotating one of said shafts and said housing, respectively, a driving sleeve loose about said shaft and provided with gear and jaw teeth, another sleeve splined to said shaft and provided with jaw and gear teeth, one of said sleeves being axially movable to bring the jaw teeth of said sleeves into clutching engagement, the gear teeth on said sleeves being adapted for operative connection with said feed mechanisms, respectively.

58. A worm wheel generator comprising a frame, a rotatable blank carrier, a tapered hob rotatably mounted on said frame, mechanism for feeding said hob in the direction of its own axis, mechanism for rotating said blank carrier including differential gearing, and distinct power transmitting means for simultaneously driving different units of said differential gearing respectively.

59. A worm wheel generator comprising a frame, a rotatable blank carrier, a tapered hob rotatably mounted on said frame, mechanism for feeding said hob in the direction of its own axis, mechanism for rotating said blank carrier including differential gearing, power transmitting means for rotating one unit of said differential gearing, and means connected with said feed mechanism for simultaneously revolving other units of said differential gearing.

60. A worm wheel generator comprising a frame, a rotatable blank carrier, a tapered hob, rotatably mounted on said frame, mechanism for feeding said hob in the direction of its own axis, mechanism for rotating said blank carrier including differential gearing, power transmitting means for rotating one unit of said differential gearing, means connected with said feed mechanism for simultaneously revolving other units of said differential gearing and, means for breaking said connection, said last mentioned means including a worm and worm wheel driven thereby, whereby said blank carrier may be rotated by said independent power transmitting means without necessity of being rotated, back through said feed connectable means.

61. A worm wheel generating machine comprising a frame, a pair of slides thereon, a blank carrier and a tapered hob rotatably mounted on said slides, respectively, feed mechanisms for actuating said slides, respectively, mechanisms for rotating said blank carrier and hob, respectively, differential mechanism including two axially aligned gears, a rotatable housing, and a pair of idlers in engagement with said aligned gears and revoluble by said housing, mechanism for correlating the rotation of said blank carrier with reference to the rotations of said hob, said axially aligned gears being connected with said blank rotation and blank carrier correlating mechanisms, respectively, compensating mechanism connected with said housing, said hob feed and compensating mechanism including parts adapted to be connected or disconnected, a feed driving member, a device enabling either of said feed mechanisms to be connected with said driving member, means for controlling said device, and means for connecting or disconnecting said parts of said hob feed and compensating mechanisms.

62. A worm wheel generating machine comprising a frame, a pair of slides thereon, a blank carrier and a tapered hob rotatably mounted on said slides, respectively, feed mechanisms for actuating said slides, respectively, mechanism for rotating said blank carrier and hob, respectively, differential mechanism including two axially aligned gears, a rotatable housing, and a pair of idlers in engagement with said aligned gears and revoluble by said housing, mechanism for correlating the rotation of said blank carrier with reference to the rotations of said hob, said axially aligned gears being connected with said blank rotation and blank carrier correlating mechanisms, respectively, compensating mechanism connecting said hob feed mechanism with said housing, a feed driving member, and means for alternatively connecting said feed mechanisms with said member.

63. A machine of the character described comprising a bed, a rotatable blank mounting thereon, a hob rotatably mounted on said bed, power means for rotating said blank mounting and hob in predetermined generating harmony, power transmitting mechanism including three axially aligned sleeves, one end of one of said sleeves being connected with the source of power, the other end carrying a gear, the middle one of said sleeves having a clutch connection with each of the others and carrying a gear, distinct blank and hob feed mechanisms each including a gear adapted to be engaged by one of the sleeve gears, and means for moving said middle sleeve, the arrangement being such that its connection with said gear carrying end sleeve is broken whenever its own gear engages with one of said feed mechanism gears.

64. A machine of the character described comprising a bed, a rotatable blank mounting thereon, a hob rotatably mounted on said bed, means for rotating said blank mounting and hob in predetermined generating harmony, feed transmitting mechanism including a particular member adapted for movement distinct from its driving action, feed mechanism including a part in position to be engaged and driven by said member, and automatically operated means for moving the latter to one of its alternative positions.

65. In a machine of the character described, the combination of a frame, a tool mounted for rotatable and axial movement thereon, a slide, a work carrier rotatably mounted on said slide, tool feed mechanism for traveling said tool axially, blank feed mechanism for traveling said blank toward the tool, a driving member, a clutch device for connecting or disconnecting either of said feed mechanisms with said driving member, and automatically operating means for actuating said clutch device.

66. A machine of the character described comprising a bed, a tool support and a slide movable thereon, a rotary blank carrier upon said slide, a worm wheel for rotating said carrier, a driving shaft extending parallel to the direction of slide movement, and mechanism operatively connecting said shaft and wheel and including a worm gear adapted to mesh with said worm wheel, and means whereby one of said enmeshing gear toothed elements may be adjusted relative to the other in a direction along the axis of said shaft.

67. A machine of the character described comprising a bed, a blank carrier rotatably mounted thereon, a hob rotatably mounted on said bed, power means for rotating said blank carrier and hob in predetermined generating harmony, power feed mechanisms including a pair of members respectively, and a power driven device connectable with said members and adapted to transmit power to one or the other when actuated in reversed directions.

68. A machine of the character described comprising a bed, a blank carrier rotatably mounted thereon, a hob rotatably mounted on said bed, means for rotating said blank carrier and hob in predetermined generating harmony, feed transmitting mechanism including a slidably and rotatably mounted gear, blank rotational compensation mechanism and blank feed mechanism each including a gear in position to mesh with said slidable gear, and means for sliding the latter into or out of mesh with said gears.

69. A machine of the character described comprising a bed, a blank carrier rotatably mounted thereon, a hob rotatably mounted on said bed, means for rotating said blank carrier and hob in predetermined generating harmony, feed transmitting mechanism including a slidably and rotatably mounted member, blank rotational compensation mechanism and hob feed mechanism each including a unit in position to be simultaneously engaged and driven by said slidable member, and means for sliding the latter into or out of its double engagement with said units.

70. In a machine of the character described, the combination of a frame, a work carrier mounted for rotatable and feeding movements thereon, a tool spindle mounted for rotating and reciprocating movements on said frame, means for feeding said work carrier, a driving member connectable with and disconnectable from said work feeding means, means for rotating said tool spindle and work carrier at correlated rates of speed, mechanism for feeding said tool spindle, compensating work carrier rotation mechanism, adapted to be actuated together with said tool feed mechanism, and a control device for simultaneously connecting or disconnecting both of said mechanisms with said driving member when the latter is disconnected from said work feeding means, whereby either feed movement may be started then stopped and the other feed movement started without disturbing the harmonious correlated rotatable connection between the work and tool.

71. A worm gear wheel generating machine comprising the combination of a rotatable blank carrier, a rotary tool spindle, means for correlating the rotations of said blank carrier and tool spindle, a feed driving member, distinct mechanisms for imparting a feed movement to said blank carrier and tool spindle, respectively, means adapted to be controlled by the operator for establishing driving relation between said member and one or the other of said distinct feed mechanisms or for rendering said feed driving member inoperative to transmit power to either of said mechanisms, and a device for controlling said controlling means whereby to prevent its establishing one of said feed driving connections with said member.

72. A worm gear wheel generating machine comprising the combination of a rotatable blank carrier, a rotary tool spindle, means for correlating the rotations of said blank carrier and tool spindle, a feed driving member, mechanism for imparting a relative feed movement between said blank carrier and tool spindle, means for establishing driving relation between said member and said feed mechanism, and a device for controlling said means whereby to prevent its establishing said feed driving connection.

73. A worm gear wheel generating machine comprising the combination of a rotatably mounted blank carrier, a rotatably mounted tapered hob, means for correlating said rotating movements, means for feeding said hob perpendicularly to the axis of said blank carrier so as to effect engagement therebetween, differential mechanism for compensating the rotational movement of said blank carrier to suit said hob feed movement, and power transmitting mechanism comprising two members, each of which is movable into and out of engagement with the other, one of which being furthermore adapted when so moved to connect or disconnect said feeding means and said differential mechanism, the arrangement being such that the shift of one of said members to a certain position effects both its disengagement from the other and the disconnection of said feeding means and differential mechanism.

74. A worm gear wheel generating machine comprising the combination of a rotatably mounted blank carrier, a rotatably mounted hob, mechanism for correlating said rotating movements, means for feeding said hob perpendicularly to the axis of said blank carrier so as to effect engagement therebetween, differential mechanism for compensating the rotational movement of said blank carrier to suit said hob feed movement, and power transmitting means comprising two members, each of which is movable toward the other sufficient to operatively connect them, and each of which is movable in a direction away from the other to a position beyond the range of movement of the latter in the same direction, one of said members being adapted to connect said mechanisms.

Signed by me this 28th day of June, 1919.

CHARLES H. SCHURR.